(No Model.)
C. Z. HOPPES.
BROOM HOLDER.
No. 551,823.
Patented Dec. 24, 1895.
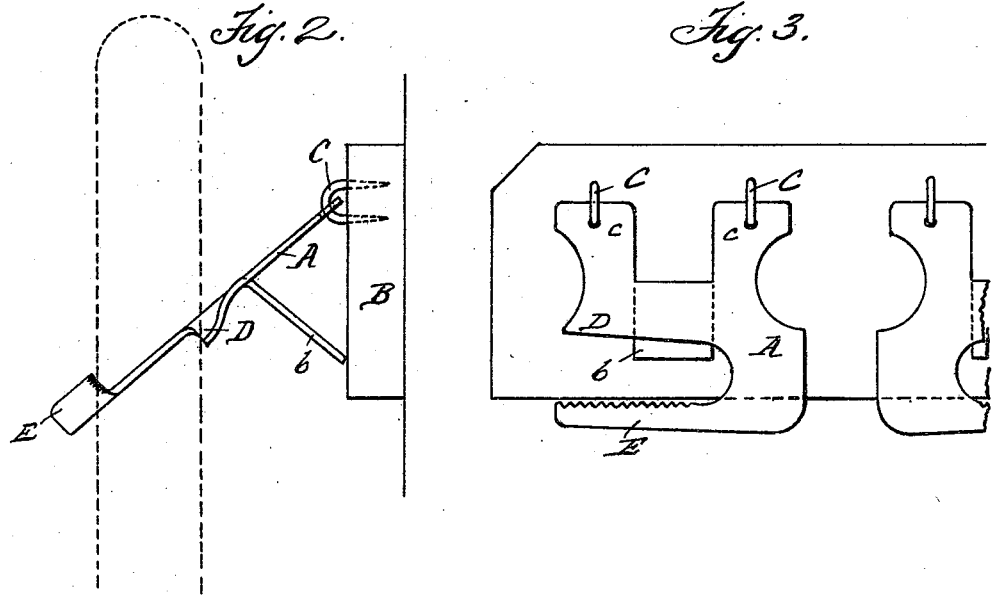
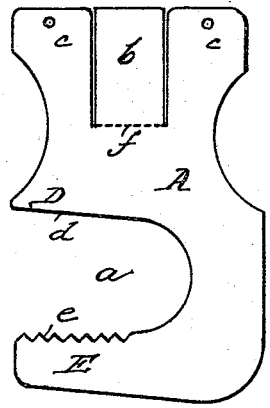
Witnesses:
David Levan
U. M. Stewart
Charles Z. Hoppes
Inventor.
by — W. J. Stewart
Attorney.

UNITED STATES PATENT OFFICE.

CHARLES Z. HOPPES, OF TAMAQUA, PENNSYLVANIA.

BROOM-HOLDER.

SPECIFICATION forming part of Letters Patent No. 551,823, dated December 24, 1895.

Application filed August 15, 1895. Serial No. 559,356. (No model.)

*To all whom it may concern:*

Be it known that I, CHARLES Z. HOPPES, a citizen of the United States, residing at Tamaqua, county of Schuylkill, State of Pennsylvania, have invented certain Improvements in Broom-Holders, of which the following is a specification.

The object of my invention is to provide a very simple and cheap, as well as efficient, holder for brooms and other implements having similar handles.

It consists of a single part which is punched from sheet metal and suspended so as to be capable of swinging vertically above a normal inclined position, the handle being pushed into a receiving-recess while the holder is raised to a substantially longitudinal position and being firmly grasped therein as the plate resumes its inclined position.

The construction and manner of using will be readily understood by reference to the accompanying sheet of drawings, in which—

Figure 1 is a plan view of one of my holders as punched from the sheet metal. Fig. 2 is an elevation showing one of my holders in its normal suspended position, a handle being represented as grasped between the edges of the recess, and the position assumed by the holder when the handle is inserted in the recess being also indicated in dotted lines. Fig. 3 is a front elevation of a pair of holders.

The holder A, as stated, is preferably formed by punching the same from sheet metal, which may be very cheaply done by means of suitable dies. Its essential features are, first, pivoting-ears $c\ c$, by which it may be conveniently suspended so as to swing in a vertical plane; second, an open recess $a$ of somewhat greater width than the thickness of the handles which are to be grasped thereby, and, third, a brace $b$ which is formed by bending down a portion of the plate which is united only on the line $f$.

I prefer to suspend the holder by means of ordinary staples C passing through apertures in the pivoting-ears $c\ c$ and driven into a wall-plate B, or any convenient place; and the brace $b$ is arranged to support the holder in an inclined position, as indicated.

When it is desired to insert a handle in the holder, the latter is raised toward the horizontal position indicated by dotted lines in Fig. 1, when the handle will easily enter the recess $a$. On being released the holder falls until stopped by the brace $b$, and in so doing firmly grips the handle between the edges $d$ and $c$ of the recess, the latter of which is preferably serrated to more firmly engage it, but the effectiveness of the grip being mainly due to the natural tendency of the handle to maintain a vertical position, while the plate assumes an incline instead of remaining at right angles as when the handle was inserted. The strain brought upon the holder by the weight of the implement tends to bend the separated portions D and E of the holder respectively downward and upward, as shown in Fig. 1, the spring of the plate being sufficient to ordinarily permit such temporary distortion.

In order to loosen the handle from the holder it is only necessary to raise it until the latter is again in about horizontal position, when it is easily removed.

I am aware that broom-holders have heretofore been devised in which the handle is supported in a manner similar to that above described, and I do not claim that any new principle of operation is involved in my device; but I have provided a new and improved article of manufacture for the purpose intended, in that it is complete in a single piece; may be made in a single operation, as indicated in Fig. 1; may be shipped as a perfectly flat plate, and is thereafter put into use by merely bending the brace $b$ to the required angle and finally supporting the holder by ordinary means (staples) so as to be satisfactorily operative.

What I claim is—

As a new article of manufacture a holder for brooms or similar handled implements consisting of a sheet metal plate having a recess $a$ to receive the handle, an integrally formed bendable brace $b$, and integrally formed pivoting ears $c$ for supporting the same, substantially as set forth.

In testimony whereof I affix my signature in presence of two witnesses.

CHAS. Z. HOPPES.

Witnesses:
L. S. FOLLWESLER,
WM. PRISER.